J. L. Devol,

Churn.

No. 102,509.   Patented May 3, 1870.

Witnesses:

J. L. Devol,
Inventor.

UNITED STATES PATENT OFFICE.

JONATHAN L. DEVOL, OF PARKERSBURG, WEST VIRGINIA.

Letters Patent No. 102,509, dated May 3, 1870; antedated April 29, 1870.

IMPROVEMENT IN CHURNS.

The Schedule referred to in these Letters Patent and making part of the same.

*To all whom it may concern:*

Be it known that I, JONATHAN L. DEVOL, of Parkersburg, in the county of Wood and State of West Virginia, have invented a new and useful Improvement in Churns; and I do hereby declare that the following is a full, clear, and exact description thereof, reference being had to the annexed drawings making part of this specification, in which—

Corresponding letters denote corresponding parts in the several figures.

Figure 1:
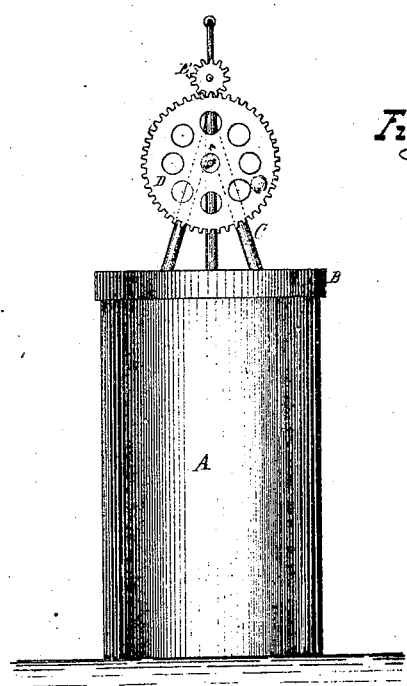
Figure 1 is an elevation of my improved churn.
Figure 3:
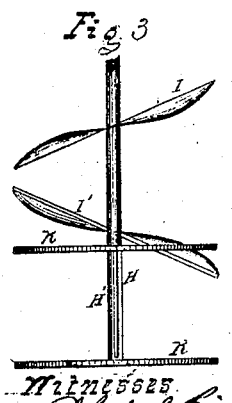
Figure 3 is a detached view of the dashers, and a portion of the rods or staves to which they are attached.

This invention relates to that class of churns which have dashers attached to rods moving vertically within them, and It consists in the combination and arrangement of its parts, as will be more fully described hereinafter.

To enable those skilled in the art to make and use my invention, I will proceed to describe its construction and operation.

A, in the drawings, represents a vessel for containing the cream or milk to be churned, and which may be of any dimensions required, and may be made of wood, or any other suitable material.

B represents a cover, which rests upon the top of vessel A, and forms a tight joint therewith, and thus prevents the escape of any cream or milk at that point when the churn is in operation.

Figure 2:
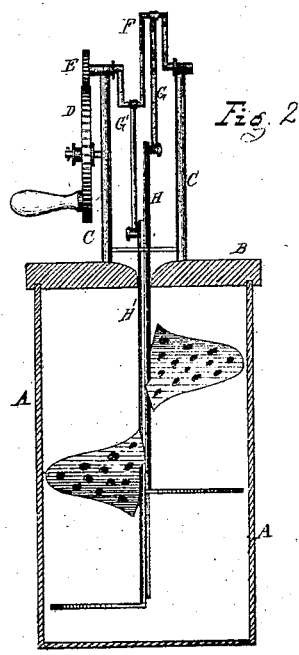
Figure 2 is a central vertical section of the churn, and a side elevation of the operating mechanism.

C C represents a frame-work of metal, or of wood, which rests upon, and is secured to, the cover B, from which it rises for a distance sufficient to enable it to receive in its upper end, or ends, a crank-shaft, and leave room between it and the cover for the operation of the connecting-rods, as shown in fig. 2.

D represents a gear-wheel, which is pivoted to one side of frame C at such a point as to cause the cogs upon its periphery to mesh into and drive the pinion E, which is attached to the outer end of the crank-shaft.

This wheel is to be larger in diameter than the pinion which it drives, it being, say, three or four times its diameter, the object being to give a rapid motion to the dashers by a slow motion of the wheel D.

F represents a crank-shaft which has its bearings in boxes formed in or secured to the upper ends of the frame C, between which points it has formed in it two throws or cranks, which are opposite to each other, so that, as one of the dashers is being raised, the other shall be forced downward at the same time, and thus cause a violent agitation of the contents of the churn.

G G' represent connecting-rods, which connect the crank-shaft with crank-pins in the upper ends of the dasher-rods, as shown in fig. 2.

H H' represent two semicircular rods which pass down through an aperture in the cover B, and in which they fit singly, so as to prevent the escape of the milk.

The upper ends of these rods are provided with a crank-pin to which the connecting-rods are attached for giving motion to them.

To the lower ends of these rods are secured semicircular perforated disks, K K', while at a suitable distance above such disks there are attached two other semicircular disks, I I', one to each of the rods, as in the former case.

These last named disks are in the form of screws, and sustain about the same relation to their rods that a propeller-wheel does to its shaft.

The office of these screw disks is to receive against their under surfaces the cream or milk which passes up through the apertures in the lower ones, and thus, in consequence of the outward direction which will be given to it, to cause it to come in contact with the sides of the vessel with great violence, and thus break up the little globules contained therein.

Figure 4:
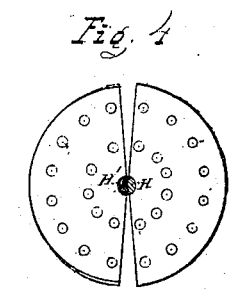
Figure 4 is a plan view of the dashers, showing, also, the manner of keeping the dashers in position with reference to each other.

By reference to fig. 4 of the drawings it will be seen that the flattened inner surface of the rod H' has a groove formed in it, and that the rod H has, upon its corresponding face, a projection which fits into said groove, the object being to cause said rods to form guides for each other, and thus prevent the lower ends thereof from becoming bent by use.

Having thus described my invention,

What I claim, and desire to secure by Letters Patent, is—

1. The combination of the screw-formed perforated dashers I I', and the flat perforated dashers K K', arranged to operate substantially as and for the purpose set forth.

2. The semicircular rods, when their lower ends are provided with a tongue and groove, substantially as and for the purpose set forth.

3. The combination of the screw disks I I' and the flattened rods H H', substantially as shown and described.

4. Arranging within a churn two dasher-rods, having one flat surface, and upon which there are secured two semicircular dashers, one of a screw form and the other flat, the arrangement being such that the two flat surfaces come in contact with and thus support each other, substantially as and for the purpose set forth.

In testimony whereof I have signed my name to this specification in the presence of two subscribing witnesses.

J. L. DEVOL.

Witnesses:
 GEORGE LOOMIS,
 W. S. DEVOL.